United States Patent [19]

Kondo et al.

[11] 4,331,385
[45] May 25, 1982

[54] ELECTROCHROMIC DISPLAY DEVICE

[75] Inventors: Shigeo Kondo, Hirakata; Nobuyuki Yoshiike, Ikoma, both of Japan

[73] Assignee: Matsushita Electric Industrial Co., Ltd., Kadoma, Japan

[21] Appl. No.: 139,122

[22] Filed: Apr. 10, 1980

[30] Foreign Application Priority Data

Apr. 17, 1979 [JP] Japan .................................. 54-47590
Apr. 17, 1979 [JP] Japan .................................. 54-47591
Apr. 17, 1979 [JP] Japan .................................. 54-47598

[51] Int. Cl.³ .............................................. G02F 1/17
[52] U.S. Cl. ................................................. 350/357
[58] Field of Search ...................................... 350/357

[56] References Cited

U.S. PATENT DOCUMENTS

| | | | |
|---|---|---|---|
| 3,708,220 | 1/1973 | Meyers et al. | 350/357 |
| 3,973,829 | 8/1976 | Giglia | 350/357 |
| 3,978,007 | 8/1976 | Giglia et al. | 350/357 |
| 4,088,395 | 5/1978 | Giglia | 350/357 |

*Primary Examiner*—James W. Davie
*Attorney, Agent, or Firm*—Amster, Rothstein & Engelberg

[57] ABSTRACT

The invention relates to an electrochromic display device (referred to as ECD hereinafter) which is stably workable for a long period and shows a long cycle life. The ECD of the invention has its feature in using a counter electrode which comprises a collector composed of a valve effect having metal such as titanium, tantalum, aluminum and the like, the metal being hardly soluble in an electrolyte, and an active material on the said collector and electrically connected to the said collector, the active material being selected from reductant of tungsten oxide, iron berlinate and the like and being able to carry out a reversible oxidation reaction at a lower potential than that at which the collector carries out an oxidation reaction.

5 Claims, 7 Drawing Figures

ELECTROCHROMIC DISPLAY DEVICE

The invention relates to an electrochromic display device (referred to as ECD hereinafter) utilizing an electrochemically reversible colour reaction. More specifically, the invention relates an ECD having a stable workability and an improved cycle life by using a counter electrode composed of a collector comprising a metal selected from the group of metals having valve effect, and an active material thereon and electrically connected to the collector. The collector and the active material are bonded into one body by using a conductive material (i.e., carbon or other electrochemically inactive materials) and a binding agent.

An ECD is generally composed of a displaying electrode, a counter-electrode and an electrolyte interposed between them. The use of Nesa glass and stainless steel as a collector for the counter electrode has already been known. Japanese Patent Laid Open Gazette No. 34163/1971 discloses the use of a metal, such as, lead, gold, tantalum etc. as a counter electrode.

Figure 1A:
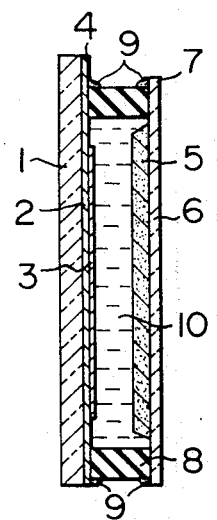
FIGS. 1A, B and C show different embodiments of conventional electrochromic display devices.
Figure 1B:
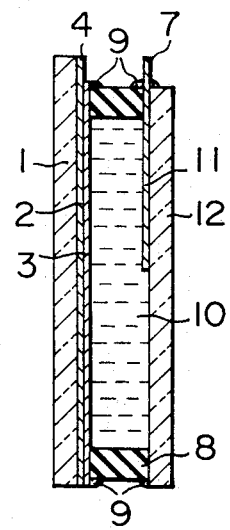
Figure 1C:
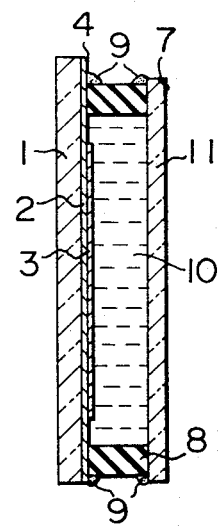

The functioning of the conventional ECD is explained in the following with reference to FIG. 1a, b and c. In 1a, 1 shows an optically transparent substrate, such as glass and, plastic plate; 2 shows an optically transparent electrode consisting of tin oxide, indium oxide etc.; 3 shows an electrochromic thin film consisting of a transition metal oxide, such as, tungsten oxide, molybdenum oxide etc.; 4 shows a terminal for applying voltage to the electrochromic material; 5 shows a counter electrode which consists of a collector (6), a reactive material thereon (such as, a reductant of tungsten oxide), and a conductor (such as carbon) and a bonding agent. The latter three materials (not shown) come into contact with the surface of collector 6 consisting of stainless steel. 7 shows a terminal for applying voltage to the counter electrode; 8 shows a spacer interposed between the display electrode (which consists of 1, 2, and 3) and the collector 6 for the counter electrode, with the spacer adhered to them with an adhesive 9 in order to form one body. 10 shows an electrolyte comprising a supporting material such as lithium perchlorate dissolved in an organic solvent such as propylene carbonate or employing concentrated sulfuric acid. Furthermore, in the electrolyte 10, white-coloured pigment (not shown), such as titanium oxide, alumina etc. are dispersed in order to reflect light. In the conventional ECD thus constructed a problem occurs wherein the stainless steel of the collector 6 for counter electrode gradually dissolves into the electrolyte 10 and the dissolved stainless steel becomes electrically deposited on the surface of the electrochromic substance 3 while the device is display-ing thereby gradually disturbing the appearing-disappearing function of the ECD. Especially when concentrated sulfuric acid is used as the electrolyte in the ECD, the dissolution of the collector 6 for counter electrode not only has a great disturbing effect on the displaying function, but also raises a problem of the corrosion of the optically transparent electrode 2, thereby making it difficult to bring the ECD into practical use. Another type of ECD using lead, gold etc. as an active material for the counter electrode has been proposed. However, this type of ECD raises other similar problems. The ECD is graphically shown in FIG. 1b and 1c. In those cases, the active material for counter electrode 11 can function as a collector as it is, and the ECD is provided with an insulating back plate 12 such as glass, and plastic plate. Therefore, the lead or gold of the active material for the counter electrode dissolves into the electrolyte in a thus constructed ECD. The reactive material dissolved into the electrolyte is deposited on the surface of display electrode, thereby disturbing the displaying function of the ECD.

Still another type of ECD is disclosed in the prior art. In this type of ECD, tantalum is used either as the collector or the active material for the counter electrode. In this type of ECD, the above mentioned problem rarely occurs, but there is a problem of instability in the operation of such an ECD. In this type of ECD, a tantalum metal plate is used for the dual purposes of a reactive material and a collector for the counter electrode. Therefore tantalum oxide is formed on the tantalum surface of the counter electrode at the time of display. Specifically, the reduction reaction of tungsten oxide occurs on the display electrode 3 and at the same time the oxidation of tantalum metal plate surface occurs on the counter electrode. The formation of the tantalum oxide, an insulating material, on the surface of the counter electrode makes it difficult for a current to pass through the ECD, thereby hindering the disappearance function of a display, since it is difficult for a current to pass and erase the display because of the existence of the insulating material on the surface of the counter electrode. So, under the present state of the art, a fully practical ECD displaying a stable operation has not been provided yet.

The main object of the invention is to provide a practical ECD exhibiting a stable operation.

To satisfy this objective, the invention provides a practical ECD in which a valve effect having metal such as titanium, tantalum and aluminum is used as a collector for a counter electrode which is in contact with a film of an active material in order to prevent the formation of an insulating oxide film on the surface of the collector. The invention is based upon the discovery of an electrochemical reaction of the active materials which prevents the formation of the insulating oxide film and by virtue of this discovery the invention can provide an ECD which can furnish a stable operation from a practical standpoint.

The invention will be discussed in detail in the following.

The ECD of the invention is constructed by combining counter electrodes consisting of a collector and an active material on the counter electrode electrically connected to the collector. More specifically, a conductor such as carbon which is inactive to the electrolyte is bonded to the active material on the counter electrode with a bonding agent. The collector for the counter electrode is made of a metal having a valve-effect, which is barely soluble chemically and electrochemically into the electrolyte. The metal which has a valve-effect is electrically connected to the active material on the counter electrode so as to prevent any shift of applied voltage by a potential shift of the oxidation reaction in the ECD. Metals such as titanium, tantalum, aluminum and the like and an alloy of these metals are illustrated as examples of metals having a valve effect. The active materials on the counter electrode are selected from the substances which carry out the reversible oxidation reaction at voltage lower than that which would cause oxidation reaction on the said collector. Substances such as a reductant of tungsten oxide, molybdenum oxide and iron berlinate or the derivatives thereof are examples of suitable substances for the active material.

The invention is discussed in detail in the following with reference to the drawings.

Figure 2A:
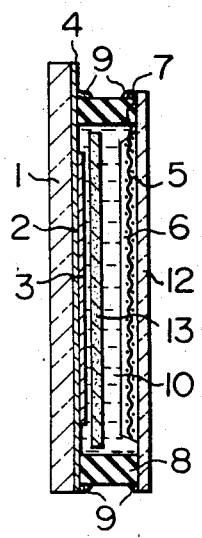
FIGS. 2A and B show embodiments of electrochromic display devices according to the present invention.
Figure 2B:
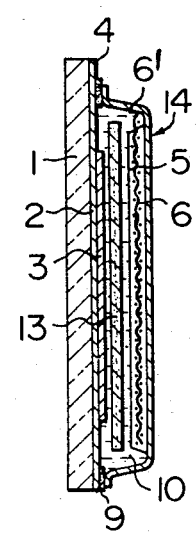
Figure 3A:
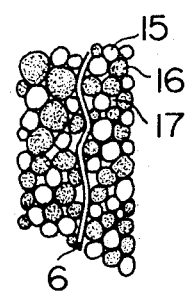
FIGS. 3A and B show enlarged views of the relationship between collector, active material, conductive powder and bonding agent of the counter electrode of the present invention.
Figure 3B:
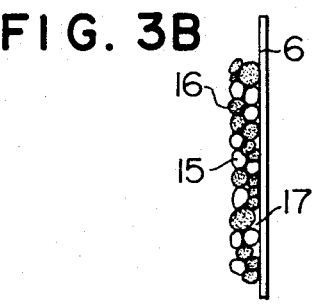

First, referring to FIG. 3a, and 3b, 15 shows the active material on the counter electrode which is made of a reductant of tungsten oxide, molybdenum oxide, or of iron berlinate or the derivatives of iron berlinate. 16 shows a conductive powder material, such as carbon and so on, which is inert to the electrolyte. 6 shows a collector made of titanium, tantalum, aluminum and the like and of at least one kind of metal having a valve effect. 17 shows a bonding agent which is blended so that each of 15, 16 and 6 are electrically connected. Examples of the usable bonding agents includes polytetrafluoroethylene polymer, tetrafluoroethylene-hexafluoroethylene copolymer, polyethylene polymer, polypropylene polymer and the like. The collector can be of any desired shape and configuration, and is often used in the form of a plate, punched metal, net and the like. In the net form, an expanded net is preferably used, because of the lower price achieved by means of its industrial mass-production. The counter electrode having such a structure is prepared by press-forming the counter electrode forming materials (15, 16 and 17) other than the collector 6, on a part or the whole of the surface of the collector 6. Alternatively, the materials (15, 16 and 17) may be dispersed in a suitable solvent and then coated on the collector by means of screen printing, coating and the like. At the time of coating, a heat-treating process may be added thereto in order to increase the mechanical strength of the counter electrode. An ECD constructed by using such a counter electrode is shown in FIG. 2.

The invention is illustrated in the following by way of Examples for the purpose of illustration without any intentions to add any restrictions to the invention, which is construed only on the basis of the appended claims.

EXAMPLE 1

In FIG. 2a, 1 shows an optically transparent substrate 2 shows an optically transparent thin film indium oxide electrode which has a resistance of 20 $\Omega/cm^2$; 3 shows an electrochromic substrate layer which is a tungsten oxide film deposited on the surface of 2 by the electron beam vapour-depositing process. 4 shows a terminal for applying voltage on the display plate; 5 shows a counter electrode which is prepared by press-forming a counter electrode active material consisting of a mixture of tungsten oxide reductant, graphite powder and tetrafluoroethylene-hexafluoropropylene copolymer at a mixing ratio of 5:5:1 on both sides of a titanium net collector 6 made of a metal having a valve effect using a pressure of 1 ton/$cm^2$. 7 shows a titanium lead wire used as a terminal for applying voltage to the counter electrode; 8 shows a spacer, which consists of glass, interposed between the substrate of the display electrode 1 and the back base plate 12 consisting of glass and bonded to the base plates to form one body by means of a U.V. setting type resin containing acrylate resin 9 as its main component. 10 shows an electrolyte comprising propylencarbonate containing lithium perchlorate in a concentration of 1 mol per liter. The pouring of the electrolyte into the ECD case mentioned above is carried out by a vaccum pouring method after removing the oxygen dissolved in the prepared electrolyte. 13 in FIG. 2a and 2b shows a porous white-coloured reflecting plate used to shade the counter electrode which is made of a porous alumina plate.

The ECD was tested with respect to its life period by applying cycles of −1.0 volt for 1 second to make the display appear and +1.0 volt for 1 second to make display disappear. The ECD does not show any abnormality in the displaying function of the display even after $1.25 \times 10^7$ cycles.

EXAMPLE 2

Example 1 was repeated except that iron berlinate reductant was used as the active material for the counter electrode instead of tungsten oxide reductant. The prepared ECD was tested under the same conditions as in Example 1 and showed the same life result.

EXAMPLE 3

In FIG. 2b, 1 shows an optically transparent substrate 2 shows an optically transparent electrode consisting of tin oxide; 3 shows an electrochromic displaying layer consisting of tungsten oxide; 4 shows a terminal for applying voltage to the display electrode. 14 generally shows a cell container acting as the voltage applying part of a counter electrode as a whole, and the case contains a counter-electrode prepared by press-forming an active material consisting of a mixture of iron berlinate, carbon and tetrafluoroethylene-hexafluoropropylene copolymer in a mixing ratio of 5:5:1 on both surfaces of the expanded net of titanium plate 6 which shows a valve effect, using a pressure of 1 ton/$cm^2$. The elongated part of the net is spot-welded to the container 14 at point 6'; 13 shows a white light scattering plate prepared by press-forming titanium oxide powder with tetrafluoroethylene-hexafluoropropylene copolymer; 9 shows an adhesive whereby a cell container 14 was adhered to the substrate display electrode 1 to form one body; and 10 shows an electrolyte consisting of propylene carbonate dissolved thereinto $LiClO_4$ in a concentration of 1 mol/liter. The ECD thus constructed exhibited the same life period as that shown in FIG. 2a. The expanded net of titanium plate collector used in this Example is easily made in comparison with that using titanium wire net and thus it was found that the expanded net of titanium plate can be practically used in an industrial use. The construction of a cell container with titanium plate has no deleterious effects on the life period characteristics of the ECD and, it facilitates the manufacturing of ECD and produces a markedly improved effect.

EXAMPLE 4

The same ECD as that of Example 2 was prepared except for the use of tantalum wire net as the metal having a valve-effect as the electro-conducting material of the counter electrode. The ECD thus constructed was tested for its life period under a cycle condition of afternating the appearing display for 1 second at −1.0 volt and the disappearing display for 1 second at +1.0 volt and its operation continued satisfactory even after $1.25 \times 10^7$ cycles.

EXAMPLE 5

The same ECD as that disclosed in Example 2 was prepared except for the use of an expanded net of aluminum having a valve effect as the collector material of the counter electrode. The same test as in Example 2 was carried out on the ECD thus prepared and the same good results, as shown in Example 2, were obtained and it remained in good condition after the test.

As illustrated in each Example the electrochromic displaying apparatus functions stably without causing any shift in applied voltage. Furthermore, the dissolving of reactive material or collector from the counter electrode does not occur at all. Therefore the invention provides a practical ECD which does not encounter any troubles in its displaying function. Although in the Examples, the use of a reductant of tungsten oxide and iron berlinate as the reactive material of the counter electrode are illustrated, it is not necessary to say that we can use any kind of material which would prevent oxidation of a metal having a valve-effect constituting the collector of the counter electrode such as the reductant of molybdenum oxide or of a derivative of iron berlinate such as iron sodium berlinate, in the invention as a collector of the counter electrode. Furthermore, some examples of single metals having valve effects are illustrated, but the alloys of these metals are also usable in the invention as is already well known in the art to improve the anticorrosion effect of these metals.

What is claimed is:

1. An electrochromic display device (ECD) in an enclosed container, comprising: a display electrode, having an electrochromic substance; a counter electrode provided opposite said display electrode; and an electrolyte contacting with said display electrode and said counter electrode, characterized by the fact that said counter electrode comprises a collector and active material electrically contacting said collector, said collector being of a metal having valve effect and said active material being of a substance causing an oxidation reaction at a voltage lower than the voltage which could cause an oxidation reaction on the collector.

2. ECD according to claim 1, wherein the metal having valve effect is one selected from the group consisting of titanium, tantalum and aluminum.

3. ECD according to claim 1, wherein the active material of the counter electrode is one selected from the group consisting of the reductant of tungsten oxide, molybdenum oxide, iron berlinate and derivatives of iron berlinate.

4. ECD according to claim 1, wherein the collector of the counter electrode is in the form of an expanded metal.

5. ECD according to any one of claims 1 to 3, further comprising a back base plate, wherein the collector of the counter electrode is used to block the back base plate.

* * * * *